(12) United States Patent
Lehmann et al.

(10) Patent No.: US 10,851,008 B2
(45) Date of Patent: Dec. 1, 2020

(54) METHOD FOR PRODUCING A COMPONENT OF RARE EARTH METAL-DOPED QUARTZ GLASS

(71) Applicant: Heraeus Quarzglas GmbH & Co. KG, Hanau (DE)

(72) Inventors: Walter Lehmann, Leipzig (DE); Mario Such, Sandersdorf-Brehna (DE); Thomas Kayser, Leipzig (DE); Andreas Langner, Freigericht (DE); Gerhard Schötz, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 306 days.

(21) Appl. No.: 15/938,156

(22) Filed: Mar. 28, 2018

(65) Prior Publication Data

US 2018/0282196 A1 Oct. 4, 2018

(30) Foreign Application Priority Data

Mar. 30, 2017 (EP) .................................. 17 163 811

(51) Int. Cl.
*C03B 19/06* (2006.01)
*C03B 19/14* (2006.01)

(52) U.S. Cl.
CPC ............ *C03B 19/066* (2013.01); *C03B 19/14* (2013.01); *C03B 2201/34* (2013.01);
(Continued)

(58) Field of Classification Search
CPC .................................................. C03B 19/066
See application file for complete search history.

(56) References Cited

U.S. PATENT DOCUMENTS 5,262,365 A * 11/1993 Oyobe ................ C03B 19/1453
501/54
8,017,536 B2 9/2011 Weber et al.
(Continued)

FOREIGN PATENT DOCUMENTS

DE  102004006017  7/2005
DE  102006043738  3/2008
(Continued)

*Primary Examiner* — Cynthia Szewczyk
(74) *Attorney, Agent, or Firm* — Dicke, Billig & Czaja, PLLC

(57) ABSTRACT

A method for producing a component with portions of a rare earth metal-doped quartz glass, an intermediate product containing voids and consisting of a SiO₂ raw material doped with rare earth metal is introduced into a sinter mold the interior of which is bordered by a carbonaceous mold wall, and is melted therein into the component by gas pressure sintering at a maximum temperature above 1500° C. A shield is arranged between the mold wall and the intermediate product. In order to indicate a modified gas pressure sintering method that ensures the production of rare earth metal-doped quartz glass with reproducible properties, a bulk material of amorphous SiO₂ particles with a layer thickness of at least 2 mm is used as the shield, the softening temperature thereof being at least 20° C. higher than the softening temperature of the doped SiO₂ raw material, and the bulk material being gas-permeable at the beginning of the melting of the intermediate product, and the bulk material sintering during melting into an outer layer that is gas-tight to a pressure gas.

17 Claims, 3 Drawing Sheets

(52) U.S. Cl.
CPC ...... *C03B 2201/36* (2013.01); *C03B 2215/03* (2013.01); *C03B 2215/50* (2013.01); *C03B 2215/66* (2013.01)

(56) References Cited

U.S. PATENT DOCUMENTS

| | | |
|---|---|---|
| 2007/0145332 A1 | 6/2007 | Koeppler et al. |
| 2009/0320521 A1* | 12/2009 | Lehmann ................ C30B 15/10 65/17.6 |
| 2010/0251771 A1 | 10/2010 | Langner et al. |

FOREIGN PATENT DOCUMENTS

| | | |
|---|---|---|
| DE | 102007045097 | 11/2012 |
| EP | 2703367 | 3/2014 |
| GB | 2331985 | 6/1999 |
| JP | 2002356340 | 12/2002 |

\* cited by examiner

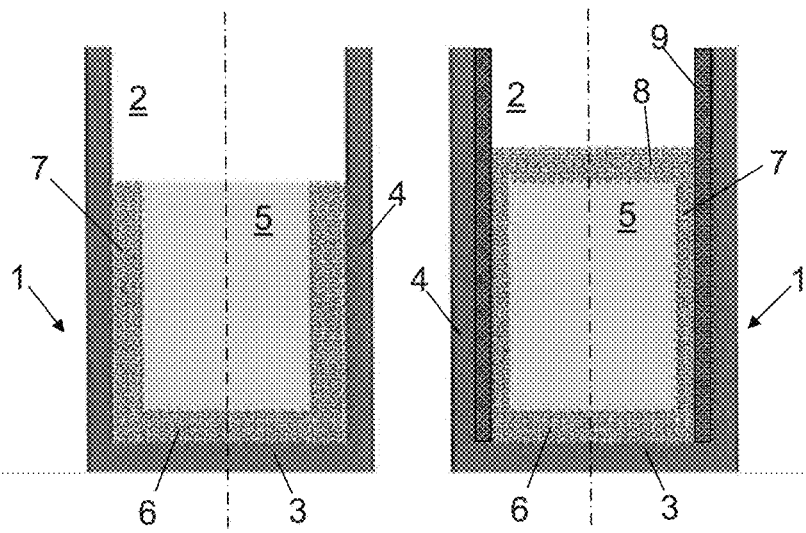
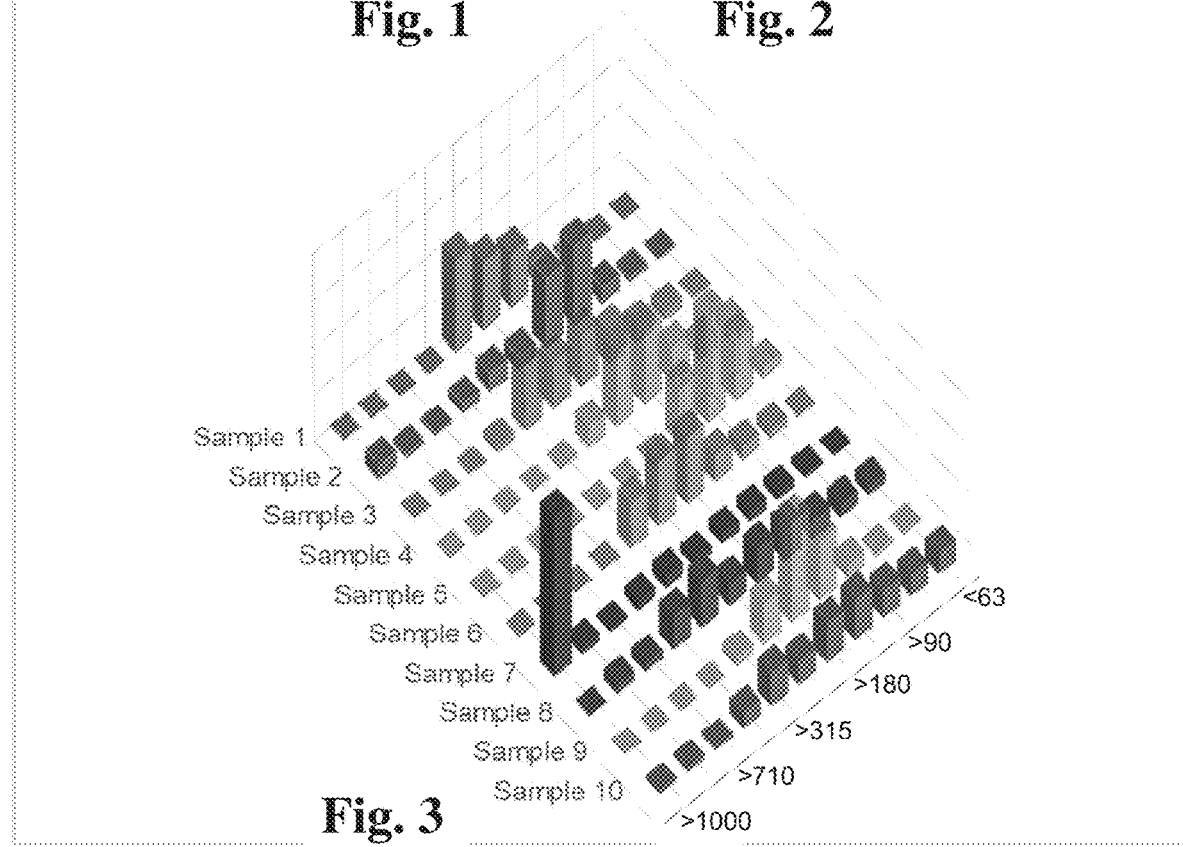

METHOD FOR PRODUCING A COMPONENT OF RARE EARTH METAL-DOPED QUARTZ GLASS

CROSS-REFERENCE TO RELATED APPLICATION

This Utility Patent Application claims priority to European Patent Application No. EP 17 163 811.7, filed on Mar. 30, 2017, which is incorporated herein by reference.

BACKGROUND

One aspect is a method for producing a component that consists at least in portions of a rare earth metal-doped quartz glass, including:
 (a) providing an intermediate product containing voids and consisting of a $SiO_2$ raw material doped with rare earth metal,
 (b) introducing the intermediate product into a sinter mold with an interior bordered by a carbonaceous mold wall, and
 (c) melting the intermediate product into the component by gas pressure sintering at a maximum temperature above 1500° C., a shield being arranged between the mold wall and the intermediate product.

The rare earth metals include the elements scandium, yttrium, and lanthanum and the lanthanides. Quartz glass doped with rare earth metals is used, for example, for the production of fittings and components for semiconductor manufacture or of fiber amplifiers or fiber lasers in laser technology. In the first area of application, the dopants improve the dry-etching resistance of the glass material, and in the second area of application, generate the amplification of laser radiation in the host material quartz glass.

DE 10 2004 006 017 A1 describes the production of a laser-active quartz glass doped with rare-earth or transition metals, by way of a "powder route." The publication starts from an aqueous slip which contains nanoscale $SiO_2$ particles produced by way of precipitation reaction as well as start compounds for the dopants in the form of water-soluble hydrate compounds. After granulation, the still porous, doped $SiO_2$ granulate is put into a graphite mold and vitrified by gas pressure sintering. The graphite mold is first heated to a sintering temperature of 1600° C. while maintaining a negative pressure. After this temperature has been reached, an overpressure of 5 bar is set in the furnace and the mold is kept at this temperature for about 30 min. During subsequent cooling to room temperature the overpressure is further maintained up to a temperature of 400° C.

A similar proposal follows also from DE 10 2006 043 738 A1 for the sintering of a quartz glass doped with rare earth metal and with nitrogen for use in semiconductor manufacture. A dry powder mixture of oxidic start substances is sintered in a hollow cylindrical graphite mold under vacuum at a temperature of 1550° C. for a period of 2.5 h, is subsequently heated to a temperature of 1700° C. and thereby vitrified into a block of transparent quartz glass. Vitrification also takes place first of all at a low pressure and then for the purpose of nitrogen doping in a nitrogen atmosphere at a pressure of 12 bar.

The use of the graphite mold in these procedures yields a sintering atmosphere with a reducing action, which may induce chemical reactions between the doped granulate and the graphite mold. Thus, in the finished quartz glass component, substances may be present in a substoichiometric or reduced oxidation state and may lead to undesired absorptions and discolorations of the doped quartz glass. Moreover, gaseous reaction products may develop during the reaction and may lead to the formation of bubbles in the quartz glass component.

To mitigate these effects and to reduce the formation of bubbles, the sintering temperature is kept as low as possible. Nevertheless, glass defects which may also be devitrifications as a result of the formation of cristobalite crystals are frequently observed in the sintered body.

A decrease of the reducing action of the graphite mold on the sintering atmosphere ensues in a generic production method for a component of laser-active quartz glass, as is known from DE 10 2007 045 097. The granulate that is doped with rare-earth metal is isostatically processed at a pressure of 100 MPa into pressed articles, and the pressed articles are pre-sintered at a temperature of 1600° C. in He atmosphere. This creates a white, pre-densified sintered body with a relatively dense outer skin which provides a certain shield against the reducing atmosphere in the subsequent melting process. The shield is alternatively configured as a dense cladding tube of quartz glass. For vitrification the pre-densified sintered bodies are heated in the gas pressure type sintering furnace first in vacuum to a temperature of 1740° C. and are then vitrified at the same temperature at a pressure of 1.5 MPa. Glass bodies of transparent quartz glass are obtained.

JP 2002356340 A discloses a doped quartz glass with high corrosion resistance to plasma for use in semiconductor production. The quartz glass contains 0.1 to 2% by wt. of zirconium (Zr) to increase the corrosion resistance, with a surface layer of 99.95% pure quartz glass (in terms of weight). In order to produce the doped quartz glass, a mixture of the starting powders is melted in a graphite crucible, the bottom of which is covered with a graphite foil and the inner wall of which is covered with a layer of pure crystal powder, first under vacuum and then in a nitrogen atmosphere.

GB 2 331 985 A describes a high-purity transparent quartz glass containing impurities of Fe, Na and K each in an amount of 0.01 to 0.3 ppm, and OH groups in an amount of 0 to 3 ppm. The transparent quartz glass does not discolor even after 20 hours of heating to 900 to 1,400° C. and thereafter illustrates an extinction coefficient of not more than 0.009 at a wavelength of 400 nm. To produce the quartz glass, powdery silica is melted at a temperature of at least 1700° C. in a graphite mold, the inner surfaces of which are covered with a porous layer of high-purity graphite, so that the silica powder does not get into contact with the mold wall.

EP 2 703 367 A1 describes a method for the heat treatment of a cylindrical block of synthetic quartz glass with the aim of adjusting the rapid axis of birefringence either in the tangential or radial direction. When heat-treated in a furnace in air, the opposite faces of the quartz glass block and the cylindrical outer surface are covered with thermal insulator layers that are formed of blocks, plates or powder layers.

For these and other reasons, a need exists for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts. The patent contains at least one drawing executed in color. Copies of this patent with color drawings will be provided by the Office upon request and payment of necessary fee.

FIG. 1 illustrates a sinter mold for a gas-pressure sintering process, with a bulk material of quartz glass in which an intermediate product to be melted is embedded.

FIG. 2 illustrates a sinter mold for a gas-pressure sintering process, with a bulk material of quartz glass which fully encloses an intermediate product to be melted.

FIG. 3 illustrates bar diagrams on the particle size distribution of $SiO_2$ sands in a three-dimensional view.

DETAILED DESCRIPTION

Figure 4:
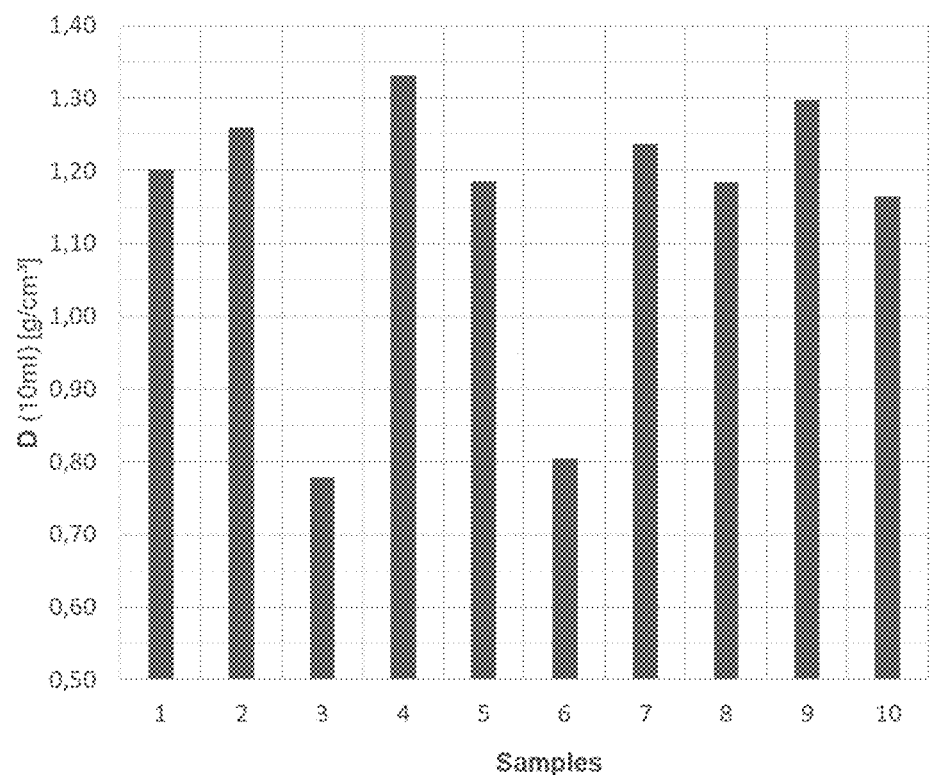
FIG. 4 illustrates bar diagrams on the bulk density of the $SiO_2$ sands.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

Gas pressure sintering is a comparatively inexpensive method for producing doped quartz glass from powdery source materials. However, a discoloration of the quartz glass is observed even with a shielding of the reducingly acting sintering atmosphere in some dopants; this hints at an unforeseeable and undesired change in the chemical composition or possibly at an inhomogeneous distribution of the dopants in the sintering process.

It is therefore the object of one embodiment to modify the known gas-pressure sintering method such that the production of rare earth metal-doped quartz glass with reproducible properties is reliably ensured.

General Representation of One Embodiment

Starting from a method of the above-mentioned type, this object is achieved according to one embodiment in that a bulk material of amorphous $SiO_2$ particles with a layer thickness of at least 2 mm is used as the shield, the softening temperature thereof being at least 20° C. higher than the softening temperature of the doped $SiO_2$ raw material, and the bulk material being gas-permeable at the beginning of the melting of the intermediate product according to the method step, and the bulk material sintering during melting into an outer layer that is gas-tight to a pressure gas.

The method according to one embodiment serves the production of a component made of rare earth metal-doped quartz glass using naturally occurring, but in one embodiment, synthetically produced $SiO_2$ raw material, which is present in particle form or which is produced from $SiO_2$ particles. The doping consists of one or more dopants, wherein the $SiO_2$ particles can contain the doping and/or are mixed with finely divided powder of the dopant or the dopants. Irrespective of this, the $SiO_2$ raw material containing the doping is hereinafter also referred to briefly as "doped $SiO_2$ raw material." The rare earth metal-doped $SiO_2$ raw material is usually present in the intermediate product as a mechanically or thermally pre-densified sintered body, pressed article or green body; however, it can also form a bulk material of particles or of a granulate of the $SiO_2$ raw material. It can thus be further densified; its reduced density compared to the fully densified component material is reflected in the fact that it contains voids. The dopant concentration is typically in the range of 0.01 to 10 mole %.

The amorphous $SiO_2$ particles of the gas-permeable bulk material consist, for example, of quartz glass which is melted from naturally occurring $SiO_2$ raw material or which is produced synthetically or from mixtures of these substances. The $SiO_2$ particles are present in the form of $SiO_2$ granulate particles, in the form of discrete spherical or cylindrical particles, such as pressed bodies, tablets, flakes, fibers and/or in the form of fragments, shards, or glass splinters.

The sinter mold usually contains carbon in the form of graphite, glassy carbon or in the form of SiC, or its inner wall or inner lining consists of these substances, which in gas pressure sintering by formation of carbon monoxide (CO) leads to a reducing melting atmosphere. The interior of the sinter mold in one embodiment has a cylindrical geometry and, if necessary, is limited by a bottom and a cylinder jacket as a sidewall.

The doped $SiO_2$ raw material in the form of the intermediate product is melted to a doped quartz glass blank by means of a modified gas pressure sintering process. The gas pressure sintering process typically includes a phase in which the intermediate product is evacuated to remove gases contained or adsorbed therein. In the following, this process phase is also referred to as the "vacuum phase." And it includes a phase in which pressure is applied to the intermediate product by means of a pressure gas in order to densify it in addition and cause bubbles to collapse. In the following, this process phase is also referred to as the "pressure phase."

The melting of the intermediate product according to method step (c) includes melting the intermediate product and maintaining the melt of the intermediate product. Melting usually starts already in the vacuum phase. The modification of this process according to one embodiment has the following effects: 1. The bulk material of the $SiO_2$ particles is gas permeable in all directions. The gas permeability (or permeability) of the bulk material has several effects, which will be examined in more detail below.

When heated, the intermediate product can release gases that are contained in voids or adsorbed and absorbed on surfaces. In order to avoid bubble formation in the component, these gases must be evacuated to the outside, which is done by suction or out-diffusion through the gas-permeable bulk material in the vacuum phase.

In the course of the gas pressure sintering process, the bulk material is thermally densified as voids collapse and flow channels become narrower. This densification process starts in the outer area of the bulk material and improves the shielding of the intermediate product against the reducing atmosphere. This means that the longer the gas pressure sintering process lasts and the higher the temperature, the lower the gas permeability of the bulk material and the stronger the shielding effect for the intermediate product. According to one embodiment, the gas-permeable bulk material at the beginning of melting of the intermediate product changes during melting into a sintered outer layer that is gas-tight to the pressure gas. Quartz glass is permeable to helium and hydrogen to a certain extent. Therefore, the pressure gas in one embodiment contains as little of these components as possible, ideally it is free of hydrogen and helium.

In the course of the gas pressure sintering process, there is thus a change in the gas permeability of the bulk material. The initial gas permeability of the bulk material, its suitability for gas out-diffusion and its thermal densification behavior are mainly determined by the shape and size of the $SiO_2$ particles. Their mean particle size is in one embodiment in the range of 150 and 300 µm ($D_{50}$ value). A mean particle size of more than 300 µm tends to yield a loose bulk which can only be thermally densified with difficulty. In addition, large $SiO_2$ particles in the bulk material tend to form large voids in which gases may be entrapped or in which pressure gas may accumulate to form large gas bubbles, which in turn can lead to a destructive bubble formation in soft glass. A mean particle size of less than 150 µm results in a compact bulk material with a comparatively high flow resistance and low suitability for gas out-diffusion right from the beginning.

a. The chemical reaction of the $SiO_2$ particles of the bulk material upon contact with the carbon of the sinter mold is weak compared to the reaction between the carbon and the doped $SiO_2$ raw material of the intermediate product. Therefore, the intermediate product is in one embodiment surrounded on all sides by $SiO_2$ particles, so that contact with the graphite-containing sinter mold is prevented or at least reliably reduced. This requires a minimum thickness of the bulk material of 2 mm, in one embodiment at least 5 mm between the carbonaceous wall and the intermediate product.

2. On the other hand, gases released from the intermediate product can escape to the outside through the interstitial spaces of the bulk material at a sufficiently high gas pressure, which reduces the risk of gas inclusions and bubble formation. The bulk material of the $SiO_2$ particles therefore promotes a gas diffusion in the direction from the inside to the outside, which is hereinafter also referred to as the "venting or gas out-diffusion function." This is influenced by the interaction of temperature and sintering degree of the bulk material on the one hand and the gas concentration distribution within the sinter mold interior on the other hand.

3. The venting function of the bulk material and the resulting gas out-diffusion, which is mainly directed outwards, and the shielding of the intermediate product enable a comparatively high melt temperature to be set during gas pressure sintering. Therefore, the maximum temperature during gas pressure sintering according to the above-mentioned method step (c) is in one embodiment above 1600° C., in one embodiment above 1700° C. Non-doped, pure quartz glass only reacts noticeably with graphite at elevated temperatures. On the one hand, this high melting temperature facilitates transparent sintering of the quartz glass component within a short period of time; it helps to reduce gas bubbles in the component and prevents the formation of cristobalite.

4. The intermediate product is introduced into the interior of the sinter mold and more or less completely fills it together with the bulk material of the $SiO_2$ particles. Ideally, the gas permeable bulk material and the intermediate product completely fill the interior of the sinter mold, at least when viewed in lateral direction, so that there is no free space left between the bottom and the sidewall and the intermediate product. During gas pressure sintering, the doped quartz glass of the intermediate product is softened. At high temperatures, for example, the intermediate product is at risk of deformation and flowing apart under hydrostatic pressure. In this phase, the bulk material stabilizes the shape of the softening intermediate product, which is also referred to as "thermal stabilization" in the following.

This is due to the fact that the $SiO_2$ particles of the bulk material consist of an amorphous material which has a higher viscosity than the doped $SiO_2$ raw material of the intermediate product. This is illustrated on the one hand by the fact that the softening temperature of the $SiO_2$ particles is at least 20° C. higher than the softening temperature of the $SiO_2$ raw material, better at least 50° C., but in one embodiment not more than 200° C. The difference in the softening temperature ensures that the bulk material can still be open-pored if the intermediate product is already sintered or melts. In this way, gases can escape from the intermediate product through the bulk material to the outside. The softening temperature is material-specific and results from the chemical composition of the bulk material. The comparatively higher viscosity is also advantageously manifested by the fact that the $SiO_2$ particles consist of quartz glass with a $SiO_2$ content of at least 99.9%, the viscosity of which is at least $10^{12.5}$ dPa·s at a temperature of 1200° C. The latter two properties are fulfilled by pure, undoped quartz glass, for example.

In addition to the particle size distribution of the $SiO_2$ particles (as explained above), the temporal change in the gas permeability of the bulk material and the above-mentioned shielding, stabilizing and venting functions depend on the bulk density and initial porosity, on the gas permeability and on the sinterability of the $SiO_2$ particles. With a high sintering capacity and based on an initially sufficiently high porosity and gas permeability of the $SiO_2$ bulk material; there is a stronger change and development of these effects in the course of the gas pressure sintering process than with a porosity that is already low from the outset.

Therefore, a bulk material with comparatively low bulk density in the range of 0.75 to 1.3 g/cm$^3$ is in one embodiment used, so that at the beginning it forms a low flow resistance to gases and has a porosity that allows gas out-diffusion. With this in mind, the bulk material advantageously has an initial effective porosity ranging from 40% to 50%.

In one embodiment, in the use of amorphous dense $SiO_2$ particles, the bulk density depends on the particle size, particle size distribution and morphology of the $SiO_2$ particles. The $SiO_2$ particles in one embodiment have a BET surface area of less than 2 m$^2$/g, in one embodiment a BET surface area of less than 1 m$^2$/g, and they have no open porosity.

However, the bulk material can also consist of porous $SiO_2$ particles with pores that are difficult or inaccessible for a gas flowing through them. This pore space is not available for gas transport.

The gas transport during the vacuum phase occurs less by viscous flow than by diffusion according to the physical laws of the so-called Knudsen flow. The free path length of the gas particles can then be compared with the size of the flow-through voids in the bulk material. Open voids (even if they are large), which are however difficult to access and, for example, can only be reached through narrow channels, do not make a significant contribution to gas transport by way of viscous gas flow or Knudsen flow.

The gas permeability of the bulk material is therefore considered to be a suitable measure of the through-flowable effective pore space and at the same time also as a measure of the suitability of the pore space for venting and gas out-diffusion under vacuum under a "Knudsen diffusion regime." This is defined in one embodiment by a Darcy coefficient between $0.8 \times 10^{-11}$ m$^2$ and $3 \times 10^{-11}$ m$^2$ and in one embodiment by a Darcy coefficient between $0.8 \times 10^{-11}$ m$^2$ and $1.3 \times 10^{-11}$ m$^2$. The flow velocity of a gas can be used to quantitatively measure the gas permeability of a bulk material, which is set at a given pressure gradient between upstream and downstream pressure. This depends on both the viscosity of the flowing gas and the nature of the pore space in the bulk material. The pore space is significantly determined by the pore volume, the pore size distribution and the pore shape. The permeability of the bulk material can be used as a characteristic measure of the open pore space, which is discussed in more detail below.

In the case of laminar flow of the medium, permeability is a material-specific constant with the metric unit m$^2$; however, it is usually given in the unit "Darcy", where: 1 Darcy: $\sim 10^{-8}$ cm$^2$. By definition, a porous material has the permeability of 1 Darcy when, at a pressure gradient of 1 atm/cm per second, a volume of 1 cm$^3$ of a liquid with a viscosity of 1 centipoise (=1 mPa·s (viscosity of water)) flows through a cross-section of 1 cm$^2$. The following correlation exists between the flow velocity of the medium and the pressure gradient:

$$v = \frac{\kappa}{\mu} \frac{\Delta P}{\Delta x} \quad (1)$$

where:

| | | |
|---|---|---|
| v | flow velocity of the medium | in m/s |
| κ | kappa; specific permeability of the bulk material | in m$^2$ |
| μ | dynamic viscosity of the flowing medium | in Pa · s |
| ΔP | delta P; the pressure difference | in Pa |
| Δx | delta x; the layer thickness of the bulk material | in m |

The kappa value is also called Darcy coefficient. It is a material parameter of the bulk material and describes its gas permeability: the higher the Darcy coefficient, the easier the medium flows through the bulk material. The Darcy coefficient is thus also a measure of the quality of the effective pore space of the bulk material which is effectively accessible to the measurement gas flow and is, for example, dependent on particle size, particle size distribution, particle shape, bulk density and roughness.

The Darcy coefficient defines the initial gas permeability of the bulk material and thus the initial effective pore space and its suitability for gas out-diffusion under vacuum under a "Knudsen diffusion regime". The initial gas permeability should not be too low, but also not too high. Average, and in one embodiment, Darcy coefficients are in the range of $0.8 \times 10^{-11}$ m$^2$ to $1.3 \times 10^{-11}$ m$^2$. During the gas pressure sintering process the bulk material is usually densified. Ideally, the bulk material is gas-permeable during the vacuum phase of the gas pressure sintering process and only densifies to the complete shield of the so far softened intermediate product when the highest process temperature is reached.

However, an initial high gas permeability of the bulk material is not detrimental if the bulk material is densified relatively quickly. This can be the case with high sintering activity of the bulk material. As a rough approximation, the particle size distribution can be used as a measure of the sintering activity of a bulk material.

This dynamic sintering and melting behavior of the bulk material takes into account in one embodiment, in which the bulk material has a gas permeability defined by a Darcy coefficient in the range of $2 \times 10^{-11}$ m$^2$ to $3 \times 10^{-11}$ m$^2$ and has a narrow particle size distribution characterized by a $D_{10}$ value between 150 and 250 μm and by a $D_{90}$ value between 350 and 450 μm.

With regard to the above mentioned "thermal stabilizing effect" of the bulk material, it has been illustrated to be advantageous in one embodiment if the $SiO_2$ particles consist of quartz glass with a $SiO_2$ content of at least 99.9%, the viscosity of which is at least $10^{12.5}$ dPa·s at a temperature of 1200° C.

Both undoped quartz glass, which is melted from naturally occurring quartz crystals, and quartz glass, which is synthetically produced from Si-containing starting materials by hydrolysis, pyrolysis or polycondensation, meet these criteria.

Alternatively, a process variant has also proved its worth, in which the bulk material contains $SiO_2$ particles of doped quartz glass, the doping comprising a dopant which reduces the viscosity of quartz glass, and wherein $SiO_2$ particles doped at different concentrations are distributed in the shield in such a way that the dopant concentration increases stepwise or gradually between the mold wall and the intermediate product.

In the outer area of the bulk material there are non-doped or slightly doped $SiO_2$ particles with a comparatively high viscosity, and in the inner area of the bulk material there are $SiO_2$ particles with a higher concentration of the dopant and thus a lower viscosity. It is thereby possible to maintain the mentioned "gas out-diffusion function" of the bulk material during gas pressure sintering even at high temperatures and to reduce mechanical stresses between the shield and the intermediate product during cooling. Dopants that reduce the viscosity of quartz glass include, for example, rare earth metals as well as fluorine and chlorine.

It has been illustrated to be favorable if the $SiO_2$ particles have a total impurity content of Fe, Cu, Cr and Ti of less than 1000 wt. ppb, in one embodiment less than 200 wt. ppb.

Contamination from the shield may pass into the quartz glass of the component at high temperatures. Depending on the wavelength of the laser or pump radiation of the optical component, impurities affect the optical attenuation. Attenuation may lead to heating and destruction of the optical component. The said metals Fe, Cu, Cr and Ti are considered to be so-called "tracer metals" whose presence indicates that other contaminants harmful in this respect are also present in the bulk material.

The abovementioned effects of the bulk material with regard to gas out-diffusion function and stabilization also depend on the layer thickness with which the gas-permeable bulk material surrounds the intermediate product. The average layer thickness is in one embodiment at least 10 mm. However, with the layer thickness of the bulk material the absolute heat capacity is increasing, which counteracts a rapid cooling of the component after melting. However, a high cooling rate is desirable to prevent crystallization in the doped quartz glass of the component. Therefore, layer thicknesses of more than 10 cm are not advantageous.

When melting the intermediate product in the gas pressure sintering process, the shield is usually vitrified into a cladding material, which is in one embodiment removed after completion of the gas pressure sintering treatment. The cladding material is removed, for example, by drilling out the vitrified intermediate product or by grinding or etching off the cladding material.

Gas pressure sintering in one embodiment involves the following process steps:

(a) a pretreatment comprising heating the intermediate product to a temperature in the range between 1000° C. and 1300° C. while applying and maintaining a negative pressure, (b) melting the intermediate product at a temperature above 1500° C. at a negative pressure and for a melting period of at least 30 minutes, with the bulk material sintering to form a gas-impermeable outer layer, and (c) a pressure treatment of the molten intermediate product at a temperature above 1500° C. in an inert gas atmosphere under an overpressure in the range between 2 bar and 20 bar for a period of at least 30 minutes.

In this embodiment of the method, a multi-stage temperature and pressure treatment is provided.

In the first process stage, negative pressure is applied to the sinter mold; the intermediate product is heated and thereby freed of gases and other volatile impurities. In doing so, it is to be avoided as far as possible that both the intermediate product and the bulk material serving as a shield are dense-sintered. Therefore, this temperature treatment is limited to a maximum temperature of 1300° C. and a negative pressure of in one embodiment less than 100 mbar (absolute pressure) is set. Since a sintering process is determined by diffusion processes that depend on both time and temperature, it is understandable that brief heating to a temperature above 1300° C. does not necessarily lead to dense sintering.

In a further process stage, the intermediate product which is freed of gases is melted at a temperature in the range from 1500° C. to about 1850° C.— in one embodiment at a temperature of at least 1600° C.—into the component made of transparent, doped quartz glass, whereby a negative pressure of in one embodiment less than 100 mbar (absolute pressure) is further generated and maintained in the sinter mold. During this melt treatment, the bulk material of $SiO_2$ particles is densified, which ideally leads to an outer layer which is gas-tight for the pressure gas of the subsequent pressure phase, and to a complete shielding of the soft intermediate product. The duration required for this depends on the sintering properties of the $SiO_2$ bulk material and is at least 30 minutes.

The gas-tight outer layer acts like a soft cladding tube around the intermediate product and, in the next stage of the process, the pressure phase, allows an isostatic pressure to be applied to the intermediate product, similar to hot pressing or hot isostatic pressing using a deformable outer cladding. A high-pressure atmosphere, for example of nitrogen or argon, is generated and maintained in the interior of the sinter mold. This overpressure treatment at high temperature therefore corresponds to a hot pressing or hot isostatic pressing of the sintered intermediate product. Gas bubbles enclosed in the quartz glass after melting are here dissolved or reduced in size.

In the case of one embodiment process variant, the intermediate product is temporarily exposed to an atmosphere containing helium and/or hydrogen in a concentration of at least 50% by vol.

Helium and hydrogen diffuse relatively quickly in quartz glass. They are capable of displacing other, slower diffusing gases from existing voids of the particle bulk or the intermediate product and are able to escape from the viscous quartz glass melt of the intermediate product even in the typically short duration of the gas pressure sintering process. Hydrogen can also dissolve in quartz glass to form hydroxyl groups. This can reduce both bubble formation and bubble growth.

The component melted from the intermediate product is usually subjected to a final treatment process that includes mechanical removal and smoothing. The mechanically treated surface can be smoothed by chemical etching or by fire polishing.

The component made of the quartz glass doped with rare earth metal is laser-active or laser-passive and used in laser technology, for example, or is intended for use in semiconductor production in an etching environment.

Definitions

Individual process steps and terms of the above description are defined in the following in addition. The definitions are part of the description. In the event of a contradiction in content between one of the following definitions and the remaining description, the statements made in the description shall prevail.

Quartz Glass

Quartz glass is here defined as a highly siliceous glass with a $SiO_2$ content of at least 90 mole %.

Granulates

A distinction can be made between build-up granulation and press granulation and, in terms of the technical processes, between wet and dry granulation methods. Known methods are roll granulation in a pan granulator, spray granulation, centrifugal atomization, fluidized-bed granulation, granulation methods using a granulating mill, compaction, roller pressing, briquetting, flake production, or extrusion.

During granulation, discrete, rather large agglomerates are formed by the agglomerations of the $SiO_2$ primary particles, which agglomerates are referred to here as "$SiO_2$ granulate particles" or "granulate particles" for short. In their entirety, the granulate particles form a "$SiO_2$ granulate."

Cleaning of the Granulate

The granulate can be cleaned before use. "Cleaning" reduces the content of impurities in the granulate. The main contaminants are residual water (OH-groups), carbonaceous compounds, transition metals, alkali metals and alkaline earth metals which originate from the feedstock or are introduced by processing. A low contamination content can already be achieved by the use of pure feedstocks and by appropriate equipment and processing under clean room conditions. In order to meet even higher purity requirements, the granulate can be treated in a rotary furnace at high temperature (>800° C.) in an atmosphere containing chlorine and oxygen. Residual water vaporizes, organic materials react to CO and $CO_2$ and many metals (such as iron and copper) can be converted to volatile compounds containing chlorine.

Sintering/Densifying/Melting

"Sintering" or "densifying" refers to a treatment at an elevated temperature of more than 1100° C., but this does not lead to complete vitrification and a transparent intermediate product. This state is only reached by "melting" in the gas pressure sintering furnace.

Vacuum/Negative Pressure

The gas pressure sintering process can involve a negative pressure phase in which the intermediate product is heated under "vacuum". The negative pressure is indicated as absolute gas pressure. Vacuum means an absolute gas pressure of less than 2 mbar.

Viscosity

The "viscosity" of the quartz glass is measured by a beam bending viscometer. Beam bending viscosimetry covers a viscosity range of $10^8$-$10^{15}$ dPas.

The measuring setup includes a heatable three-point bending device with a measuring beam made of the quartz glass to be measured (beam/strip: 50 mm long, 3 mm high, 5 mm wide). The measured variable is the deflection speed at the respective temperature. Typical viscosity values for undoped quartz glass are about $10^{12.1}$ dPa·s at a temperature of 1280° C. and about $10^{11.3}$ dPa·s at 1133° C.

Softening Temperature

It is well known that a clear-cut softening temperature cannot be assigned to glasses, but rather a softening temperature range. For the purpose of defining a temperature value, reference is made to the DIN ISO 7884 (1998) specification, according to which the softening temperature is defined as the temperature at which the glass has a viscosity of $10^{7.6}$ dPa·s. For the softening temperature of undoped quartz glass, temperature values in the range of 1600° C. to 1730° C. are mentioned in the literature.

Specific BET Surface Area

The "specific surface area (BET)" is determined according to the method of Brunauer, Emmet and Teller (BET) according to DIN 66132 and is based on gas absorption at the surface to be measured.

Embodiment

Preparation of a Porous Intermediate Product of Doped Quartz Glass

A slip of discrete, synthetically produced $SiO_2$ particles with a mean particle size of about 10 µm is produced in ultrapure water. An amount of 285.7 g of the slip with a residual moisture of 37.4% is diluted with 1000 ml ultrapure water. A pH of 10 is adjusted by adding a concentrated ammonia solution in an amount of 75 ml.

To produce a quartz glass doped with $Yb_2O_3$ and $Al_2O_3$, an aqueous dopant solution of $AlCl_3$ and $YbCl_3$ (mole ratio 4:1) is prepared in 400 ml ultrapure water in parallel and filtered by a 25 µm membrane filter. Instead of chlorides, other start substances can also be used, such as organic compounds, nitrides or fluorides.

The dopant solution in the form of a spray mist is supplied to the suspension moved by stirring for a period of 65 minutes. To produce the spray mist, the dopant solution is atomized by means of a spray nozzle, whereby a working pressure of 2 bar and a flow rate of 0.8 l/h are set. The spray mist produced in this way contains droplets with an average diameter between 10 µm and 40 µm. Due to the high pH value of the suspension, a mixed precipitation of hydroxides and oxides of the two dopants in the form of $Al(OH)_3$ and $Yb(OH)_3$ occurs immediately. The solid particles formed in this way adsorb on the existing surfaces of the $SiO_2$ particles and are thereby immobilized, thus preventing coagulation of the solid particles or sedimentation. In this way, a dopant concentration of 2 mole % Al and 0.5 mole % Yb (based on the Si content of the suspension) is adjusted in the slip. The slip mixed with the dopants is then homogenized by stirring for another 2 hours. This procedure ensures that an optimally homogeneously doped $SiO_2$ slip is obtained.

The doped $SiO_2$ slip is frozen and further processed into a granulate by so-called freeze granulation. The granulate sludge obtained after thawing is washed with ultrapure water several times and the excess water is decanted in each case.

Subsequently, the ammonia-freed and cleaned granulate sludge is dried at a temperature of about 400° C. for 6 hours. The dried granulate is welded into a plastic mold and pressed isostatically at 400 bar.

The pressed granulate obtained thereby is heated while being washed with helium and is then treated in a chlorine-containing atmosphere at about 900° C. for about 8 hours. This removes impurities from the pressed article and reduces the hydroxyl group content to less than 10 wt. ppm.

The cleaned and pressed granulate is cylindrical in shape with a diameter of 30 mm and a length of 100 mm. Its average density is about 60% of the density of the doped quartz glass. As an intermediate product, it is melted into a component made of doped transparent quartz glass in a modified gas pressure sintering process. The gas pressure sintering furnace used for this purpose is equipped with an evacuable sinter mold 1 made of graphite and is explained in detail below using an example and FIG. 1.

The bottom 3 of the sinter mold 1 is covered with $SiO_2$ particles forming a bottom layer 6 with a layer thickness of 2 cm. The mechanically pre-densified intermediate product 5 is placed in the middle of interior 2 and on the bottom layer 6. The remaining gap between sidewall 4 and intermediate product 5 is filled with $SiO_2$ particles to form a sidewall layer 7 with a layer thickness of 2 cm. Finally, the top side of the intermediate product 5 is also covered with a cover layer of $SiO_2$ particles with a layer thickness of 2 cm, as schematically illustrated in FIG. 2.

Bottom layer 6, sidewall layer 7 and cover layer 8 are also referred to in a summarizing manner as "bulk material" or "particle bulk material" hereinafter.

In order to reduce the layer thickness of the sidewall layer 7 on an experimental basis and in order to determine a minimum layer thickness required, sleeves 9 adapted to the inner diameter and made of glassy carbon were inserted at thicknesses between 5 mm and 8 mm into the interior 2 in a series of tests. It turned out that the bulk material with a layer thickness of 2 mm (diameter of the inner sleeve 9=8 mm) prevents direct contact between graphite and intermediate product 5, but that there is no large enough pore volume available to discharge the gases produced during sintering and melting of the intermediate product sideways and upwards through the bulk material. In other words, there is no longer any sufficient gas out-diffusion.

In a further preliminary test, a 2 mm thick quartz glass plate was placed on the bottom 3 instead of the bottom layer 6. It was illustrated that at a temperature above approximately 1600° C., the planar contact between quartz glass and the graphite of the mold bottom 3 leads to reactions between $SiO_2$ and carbon, which leads to massive formation of gas, which destroys the intermediate product.

Characterization of the Bulk Materials of $SiO_2$ Sands

A large number of $SiO_2$ sands consisting of $SiO_2$ particles with a $SiO_2$ content of about 100% each were analyzed with regard to grain size distribution, bulk density, porosity, gas permeability and their melting behavior. The production methods and characteristic properties of these SiO$_2$ sands are summarized in Table 1.

Measurement of the Particle Size Distribution

Particle size and particle size distribution were determined by sieve analysis using a sieving device, as described in DIN 66165 (particle size analysis; sieve analysis). A certain amount of the SiO$_2$ sands to be examined is separated by several sieves into fractions and their mass proportions are determined.

FIG. 3 illustrates the particle size distributions of Samples 1 to 10 as bar charts. Sieve mesh width W is given in μm.

In Table 1, the particle size distributions of the bulk materials are characterized by the respective $D_{10}$, $D_{50}$ and $D_{90}$ values. These values are taken from particle size distribution curves illustrating the cumulative volume of the SiO$_2$ sands as a function of the particle size. The $D_{10}$ value indicates the particle size that is not reached by 10% of the cumulative volume of the SiO$_2$ particles, and correspondingly the $D_{50}$ value and the $D_{90}$ value indicate the particle size that is not reached by 50% and 90%, respectively, of the cumulative volume of the SiO$_2$ particles.

*²): The commercially available sand No. 10 has a nominal $D_{50}$ value of 40 μm. However, the measurement of the particle size distribution by sieve analysis results in unexpectedly high $D_{50}$ and $D_{90}$ values. This measurement result is attributed to the formation of more or less loose agglomerates of the SiO$_2$ particles, which are able to withstand the mechanical stress during sieve analysis, but which otherwise do not have a significant effect on the pore volume, gas permeability and sintering behavior of the bulk material.

Measurement of the Bulk Density

The term "bulk density" (also called "bulk weight") of granulate or powder is given in mass per unit volume. Bulk density is defined as the mass of many material particles in relation to the total volume occupied by them. It is measured by filling and weighing a container with known volumes. The bulk density of substances which are present in powder or granular form is determined according to the International Standard ISO 697 (previous edition: DIN 53912). In contrast to this, "tapped density" refers to the density produced after mechanical densification of the powder or granulate, e. g. by vibrating the container. It is determined according to DIN/ISO 787 Part 11.

The bulk densities of the SiO$_2$ sands were determined on 10 ml sample volumes. The results are illustrated in column 4 of Table 1 and as a bar graph in FIG. 4. The bulk density D (for 10 ml sample volume) in g/cm³ is plotted on the y-axis.

Measurement of the Impurity Content

The impurity content of Li, Na, K, Mg, Ca, Fe, Cu, Cr, Mn, Ti, Al, Zr are determined by ICP-OES or ICP-MS methods.

Measurement of the Porosity

Porosity represents the pore volume, that is, all voids of the gas-permeable bulk material, in parts of the total volume thereof. The porosity is determined by volume measurement taking into account the specific density of transparent quartz glass, which is approximately 2.2 g/cm³.

The porosity measurement values for the SiO$_2$ bulk materials are given in column 3 of Table 1.

*¹): The high measured values of Samples 3 and 6 marked with *¹) are due to the fact that the corresponding bulk materials consist of thermally pre-densified, porous spray granulate particles with a BET surface area of about 30 m²/g (Sample 3) or 25 m²/g (Sample 6). In these bulk materials, there is pore space between the individual granulate particles as well as partially closed pores within the granulate particles. The comparatively large pore space is also noticeable in the measurement of the bulk density (it is comparatively low), but not in the measurement of gas permeability, for which only the pore volume that is effectively available for the gas flow is decisive. In contrast to the two SiO$_2$ sands of Samples 3 and 6 produced by spray granulation, all other sands illustrate no open porosity and have a BET surface area of less than 1 m²/g.

Measurement of the Gas Permeability

Gas permeability is therefore a meaningful criterion for determining the suitability of a SiO$_2$ sand for shielding in the sense of one embodiment.

Figure 5:
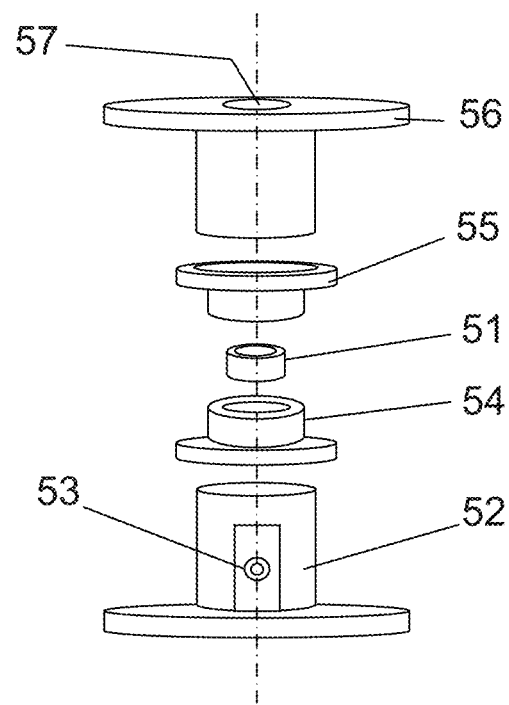
FIG. 5 illustrates a measuring cell for determining the Darcy coefficient of bulk materials by way of an exploded drawing.

FIG. 5 illustrates an exploded view of the measuring cell used to determine the Darcy coefficient. The SiO$_2$ sand to be measured is clamped within a measuring sleeve 51 between sieves arranged on both sides with a mesh width of 15 μm. The accommodating space of the measuring cell 51 for the sand has an inner diameter of 15 mm and a height of 20 mm. The measuring cell 51 is inserted into a flow channel sealed to the outside, which is formed by a base part 52 with gas connection 53, a lower (54) and an upper (55) clamping cap and by a cover 56 with a gas outlet 57. The lower clamping cap 54 has an inner bore, into which a cylindrical connecting piece of the base part 52 projects from below and lies tightly against it. The lower one of the above-mentioned sieves rests on the cylindrical connecting piece. The measuring sleeve 51 is provided with two surrounding sealing rings, the lower one of which abuts against the inner wall of the inner bore of the lower clamping cap 54 and the upper one against the inner wall of the inner bore of the upper clamping cap 55, into which a sealing connecting piece of the cover 56 protrudes from above, against which the upper sieve abuts. Base part 52 and cover 56 are clamped together by means of a clamping device (not illustrated in the figure) by means of outwardly protruding flanges.

Figure 6:
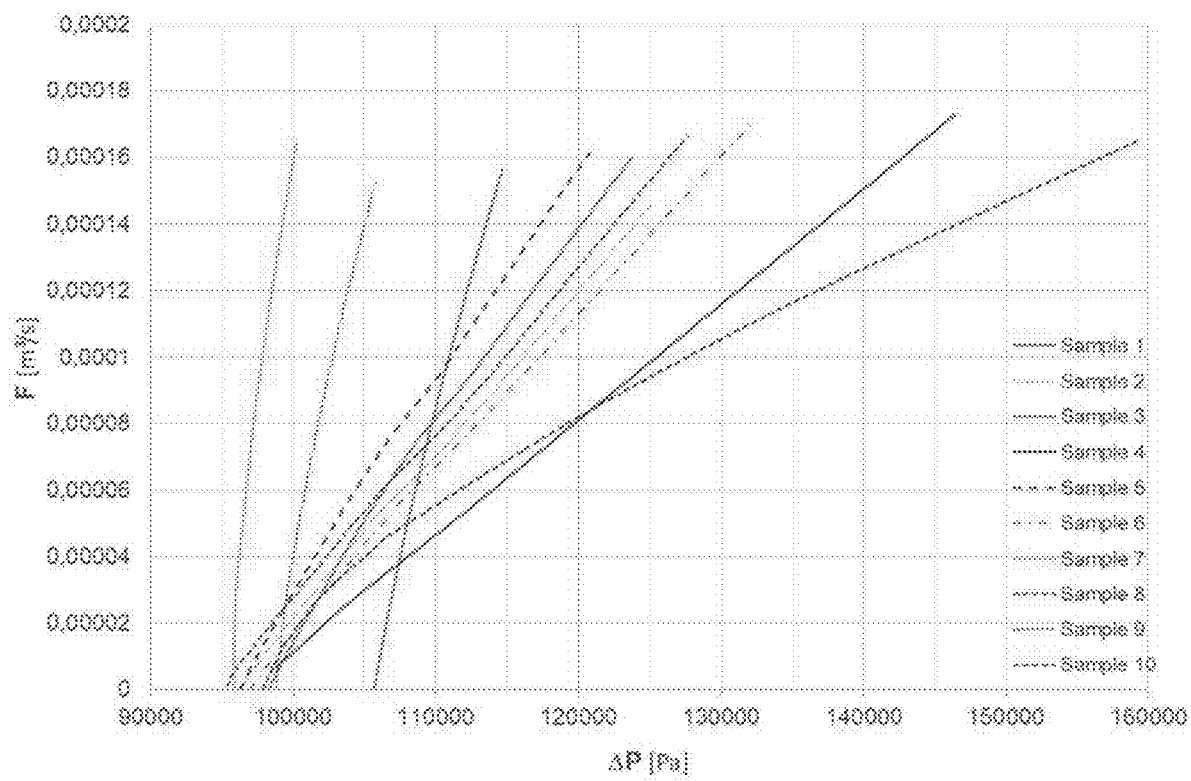
FIG. 6 illustrates a diagram on the permeability measurement of $SiO_2$ bulk materials.

During measurement, the measuring cell 51 is supplied with air from below and the differential pressure formed between the pressure in the gas supply line and the expansion pressure (=ambient pressure at the gas outlet) is measured. By changing the air volume per time unit, that is, the flow rate, between zero and about 0.00018 m³/s, the course of the differential pressure is determined for each sand as a function of the flow rate and referenced against an empty measurement (with empty measuring cell with sieves on both sides). The diagram in FIG. 6 illustrates the measurement curves obtained for the sands of Samples 1 to 10, where the y-axis illustrates the specified flow rate F (in m³/s), and the x-axis illustrates the pressure difference ΔP (in Pa) resulting in the air flow as a function of this.

The specific permeability of the bulk material is determined from the measured data using equation (1), that is, the value kappa (=Darcy coefficient).

The kappa values of the SiO$_2$ sands mentioned in column 6 of Table 3 are (arithmetic) mean values of three measurements each.

The symbols of the qualitative evaluation in Table 3 means: "++": very good, "+": good, "0": acceptable, "−": poor and "−−": very poor.

TABLE 1

Manufacture of SiO$_2$ sands and their typical characteristics

| Sample no. | Production, composition and morphology | Porosity [%] | Bulk density [g/cm$^3$] | D$_{10}$ [μm] | D$_{50}$ [μm] | D$_{90}$ [μm] | Grain distribution band [μm] | Verbal description of the size distribution |
|---|---|---|---|---|---|---|---|---|
| 1 | Quartz glass powder, produced on the basis of sol-gel method, synthetic, dense | 45.4 | 1.20 | 187 | 292 | 396 | 90-315 | Narrow |
| 2 | Quartz glass powder, produced by way of flame hydrolysis, synthetic, dense, spherical | 42.7 | 1.26 | 126 | 189 | 662 | 63-710 | Wide |
| 3 | Spray granulate of SiO$_2$ soot (fumed silica), BET surface area: ~30 m$^2$/g, amorphous, porous, spherical | 64.6*[1] | 0.78 | 113 | 254 | 419 | 63-710 | Wide |
| 4 | Quartz crystal sand of naturally occurring raw material, dense, ground | 48.8 | 1.33 | 82 | 166 | 251 | 63-315 | Narrow and fine |
| 5 | Crystalline quartz sand of naturally occurring raw material, other grain size distribution than Sample 5 | 54.4 | 1.19 | 71 | 105 | 146 | 63-180 | Very narrow |
| 6 | Spray granulate like Sample 3, but additionally cleaned by hot chlorination in the rotary furnace, thus slightly smaller BET surface area of about 25 m$^2$/g | 63.4*[1] | 0.81 | 116 | 246 | 356 | 63-500 | Wide |
| 7 | Quartz glass sand of comminuted quartz glass of naturally occurring raw material, dense | 43.8 | 1.24 | 173 | 1717 | 2877 | 63->3000 | Very wide and coarse |
| 8 | Quartz glass sand like Sample 7, but other grain size distribution | 46.2 | 1.19 | 88 | 264 | 686 | <63-800 | Very wide and fine |
| 9 | Quartz crystal sand like Sample 5, but additionally cleaned by hot chlorination in the rotary furnace | 50.1 | 1.30 | 127 | 202 | 283 | 63-315 | Narrow |
| 10 | Synthetic quartz glass granules, spherical, dense*[2] | 47.1 | 1.17 | 66 | 190 | 557 | <63->1000 | Very wide and fine |

TABLE 2

Impurities

| | Impurity elements [wt. ppb] | | | | | | | | | | | | |
|---|---|---|---|---|---|---|---|---|---|---|---|---|---|
| Sample No. | Li | Na | K | Mg | Ca | Fe | Cu | Cr | Mn | Ti | Al | Zr | [Fe] + [Cu] + [Cr] + [Ti] |
| 1 | 0.5 | 5.0 | 5.0 | 3.0 | 1.0 | 19.0 | 1.0 | 1.6 | 1.0 | 2.0 | 2.8 | 3.0 | 23.6 |
| 2 | 1.1 | 10.1 | 8.5 | 3.8 | 16.8 | 8.8 | 1.0 | 1.0 | 1.0 | 4.3 | 49.2 | 3.0 | 15.1 |
| 3 | 0.5 | 10.0 | 5.0 | 4.5 | 21.0 | 19.0 | 5.0 | 1.7 | 1.0 | 2.0 | 10.0 | 3.0 | 27.7 |
| 4 | 447.5 | 52.5 | 145.0 | 17.5 | 445.0 | 52.5 | 9.0 | 9.0 | 12.0 | 1,065.0 | 14,200.0 | 20.0 | 1,135.5 |
| 5 | 578.7 | 50.1 | 227.3 | 19.1 | 459.5 | 84.7 | 9.0 | 9.0 | 16.1 | 1,113.5 | 15,640.1 | 42.3 | 1,216.2 |
| 6 | 0.5 | 5.0 | 5.0 | 3.0 | 15.0 | 5.0 | 1.0 | 1.0 | 1.0 | 2.0 | 10.0 | 3.0 | 9.0 |
| 7 | 130.0 | 70.0 | 255.0 | 10.0 | 350.0 | 2,945.0 | 100.0 | 385.0 | 45.0 | 1,000.0 | 13,900.0 | 655.0 | 4,430.0 |
| 8 | 260.0 | 720.0 | 250.0 | 24.0 | 710.0 | 140.0 | 8.0 | 8.0 | 20.0 | 1,170.0 | 15,900.0 | 940.0 | 1,326.0 |
| 9 | 385.5 | 56.4 | 120.8 | 37.4 | 924.4 | 96.4 | 9.1 | 9.0 | 17.5 | 1,152.4 | 13,267.7 | 80.5 | 1,266.9 |
| 10 | 10.0 | 20.0 | 20.0 | 10.0 | 30.0 | 9,290.0 | 50.0 | 2,305.0 | 125.0 | 10.0 | 40.0 | 10.0 | 11,655.0 |

TABLE 3

Evaluation with respect to the qualification as a shield in gas pressure sintering

| Sample No. | Cleanliness | Sintering and melting behavior | Stabilizing and venting function | Shielding function | Darcy coeff. [10$^{-11}$ m$^2$] | Qualification |
|---|---|---|---|---|---|---|
| 1 | ++ | + | + | + | 2.655 | ++ |
| 2 | ++ | + | + | + | 0.943 | +++ |
| 3 | ++ | 0 | 0 | + | 1.240 | 0 |
| 4 | − | − | + | − | 0.597 | − |
| 5 | − | − | + | − | 1.217 | − |
| 6 | ++ | 0 | 0 | + | 0.913 | + |
| 7 | −− | + | + | − | 9.600 | − |
| 8 | − | + | + | 0 | 0.967 | 0 |
| 9 | − | − | + | − | 3.913 | − |
| 10 | −− | − | − | + | 0.550 | −− |

Gas Pressure Sintering Process

Using the SiO$_2$ sands defined in Table 1, several gas pressure sintering processes were carried out, with the intermediate product to be melted being shielded from a gas-permeable bulk material of the respective sand.

The intermediate product 5, which is embedded in the bulk material 7 (FIG. 1) or completely enveloped by the bulk material 7 (FIG. 2), is heated up slowly to 1100° C. at first. A vacuum (<5 mbar) is maintained in the sintering furnace during a preheating phase, which includes heating and the first three hours of the holding time at this temperature. Gases released from the intermediate product 5 can escape through the bulk material 7, 7a to the outside. Gas inclusions and bubble formation in the intermediate product are thus avoided.

The temperature is then raised to 1550° C. while maintaining the negative pressure. In this process, the intermediate product 5 is completely sintered and melted and the bulk material 7 is gradually densified, starting from the outside, towards the inside into an ideally gastight outer layer. The duration of this melting phase depends on the sintering properties of the bulk material 7 and is usually 2 hours, sometimes more.

During a subsequent overpressure phase, an argon atmosphere with a pressure of 12 bar is generated in the interior 2 of the sinter mold 1 and the temperature is raised to 1750° C. and maintained for a period of 1 hour. In this phase, the intermediate product 5 is already thermally largely densified (melted), but may still contain bubbles. At least the outer areas of the bulk material 7 are gastight completely or at least to a large extent, so that the high gas pressure leads to a further densification of the intermediate product 5, in which all remaining bubbles are removed as far as possible by pressing gases still contained therein into the glass matrix of the intermediate product, so that they dissolve in the glass matrix and the bubbles collapse as a result. The densified former bulk material 7 prevents the pressure gas from entering the intermediate product directly and at the same time shields the reducing interior atmosphere from the intermediate product 5. This overpressure treatment at high temperature corresponds to a hot pressing of the sintered intermediate product 5.

The quartz glass block is then cooled down to a temperature of 400° C. at a cooling rate of 2° C./min, maintaining the overpressure. After cooling down to room temperature, the quartz glass block is removed and the adhering material of the former bulk material 7 is ground down.

Samples 1 to 10 illustrated different melting and degassing behavior during the gas pressure sintering process, which is qualitatively represented in Table 3 with regard to shielding, stabilization and gas out-diffusion functions and is examined in detail below:

Sample 1: The granular particles consist of dense quartz glass with narrow particle size distribution at a comparatively low $D_{90}$ value, which results in a medium to high sintering activity. This leads to a comparatively fast densification of the bulk material, which compensates for the initially somewhat too high gas permeability.

The resulting cylindrical component made of rare earth metal-doped quartz glass serves as a preform for the production of a fiber laser.

Sample 2: illustrates a comparatively high bulk density and optimum gas permeability with a wide grain size distribution. This grain size is also very well suited as shielding material for gas pressure sintering according to one embodiment.

Sample 3: has a slightly increased gas permeability with slightly increased sintering activity, which manifests itself in a comparatively low $D_{90}$ value of the particle size distribution. The granules sinter early and, despite the high Darcy coefficient, are suitable to a limited extent as a shielding material for gas pressure sintering according to one embodiment.

Sample 4: illustrates a high bulk density and extremely low gas permeability due to small particle sizes. The crystalline structure results in low sintering activity and an abrupt melting at a temperature of about 1715° C., which leads to an abrupt densification of the bulk material. This $SiO_2$ sand is unsuitable as shielding material for gas pressure sintering according to one embodiment.

Sample 5: illustrates an unsuitable sintering and melting behavior like Sample 4 due to crystalline structure and is unsuitable as shielding material for gas pressure sintering according to one embodiment.

Sample 6: behaves similarly to Sample 3, but by comparison therewith illustrates a lower sintering activity, which has a positive effect on the melting and sintering behavior. The granules are dense-sintered at a relatively late stage and are therefore suitable as shielding material for gas pressure sintering according to one embodiment, despite the low Darcy coefficient. A possible explanation for the comparatively low Darcy coefficient is that the $SiO_2$ particles are densified during hot chlorination and have a slightly vitrified, smoother surface.

Sample 7: illustrates the highest gas permeability of all $SiO_2$ sands. However, it illustrates a wide grain size distribution with a very high $D_{90}$ value, that is, it contains coarse grains and large voids. During gas pressure sintering, pressure gas can creep underneath the intermediate product, especially via the voids of the bottom bulk material, and cause large bubbles, which can rise up in the soft glass of the intermediate product and destroy the intermediate product. This sand is unsuitable as a shielding material for gas pressure sintering according to one embodiment.

Sample 8: illustrates a similar thermal behavior (melting and sintering behavior) as Sample 2, but has high impurity content especially with regard to the metals Fe, Cu, Cr and Ti, which can get into the intermediate product during gas pressure sintering. Therefore, this sand is only suitable as a shielding material if the requirements made on the purity of the intermediate product are comparatively low.

Sample 9: illustrates an unsuitable sintering and melting behavior as Samples 4 and 5 due to the crystalline structure and is not suitable as shielding material for gas pressure sintering according to one embodiment.

Sample 10: illustrates very low gas permeability together with a high sintering activity, both due to small particle sizes. These granules are unsuitable as shielding material for the gas pressure sintering according to one embodiment.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

What is claimed is:

1. A method of producing a component that consists at least in portions of a rare earth metal-doped quartz glass, the method comprising:
    (a) providing an intermediate product containing voids and consisting of a $SiO_2$ raw material doped with rare earth metal;

(b) introducing the intermediate product into a sinter mold with an interior bordered by a carbonaceous mold wall; and (c) melting the intermediate product into the component by gas pressure sintering at a maximum temperature above 1500° C., a shield being arranged between the mold wall and the intermediate product, characterized in that a bulk material of amorphous $SiO_2$ particles with a layer thickness of at least 2 mm is used as the shield, the softening temperature thereof being at least 20° C. higher than the softening temperature of the doped $SiO_2$ raw material, and the bulk material being gas-permeable at the beginning of the melting of the intermediate product according to the method step, the bulk material sintering during melting into an outer layer that is gas-tight to a pressure gas, and the bulk material has a gas permeability which is defined by a Darcy coefficient between $0.8 \times 10^{-11}$ m$^2$ and $3 \times 10^{-11}$ m$^2$.

2. The method according to claim 1, characterized in that the bulk material has a bulk density in the range of 0.75 g/cm$^3$ to 1.3 g/cm$^3$.

3. The method according to claim 1, characterized in that the $SiO_2$ particles have a mean particle size in the range of 150 μm to 300 μm ($D_{50}$ value).

4. The method according to claim 1, characterized in that the gas pressure sintering according to method step (c) takes place at a maximum temperature above 1600° C.

5. The method according to claim 1, characterized in that the softening temperature of the $SiO_2$ bulk material is higher by at least 50° C., but not more than 200° C., than the softening temperature of the doped $SiO_2$ raw material.

6. The method according to claim 1, characterized in that the $SiO_2$ particles have a BET surface area of less than 2 m$^2$/g.

7. The method according to claim 6, characterized in that the $SiO_2$ particles have a BET surface area of less than 1 m$^2$/g and that they have no open porosity.

8. The method according to claim 1, characterized in that the bulk material has a gas permeability which is defined by a Darcy coefficient between $0.8 \times 10^{-11}$ m$^2$ and $1.3 \times 10^{-11}$ m$^2$.

9. The method according to claim 1, characterized in that the bulk material has an initial effective porosity in the range of 40% to 50%.

10. The method according to claim 1, characterized in that the $SiO_2$ particles consist of quartz glass with a $SiO_2$ content of at least 99.9%, the viscosity of which is at least $10^{12.5}$ dPa·s at a temperature of 1200° C.

11. The method according to claim 1, characterized in that the $SiO_2$ particles have a total content of impurities Fe, Cu, Cr and Ti of less than 1000 wt. ppb.

12. The method according to claim 11, characterized in that the $SiO_2$ particles have a total content of impurities Fe, Cu, Cr and Ti of less than 200 wt. ppb.

13. The method according to claim 1, characterized in that the gas-permeable bulk material surrounds the intermediate product as a layer with a mean layer thickness of at least 5 mm.

14. The method according to claim 1, characterized in that during melting of the intermediate product the shield is vitrified into a cladding material, and that after completion of the gas pressure treatment the cladding material is removed.

15. A method of producing a component that consists at least in portions of a rare earth metal-doped quartz glass, the method comprising:

(a) providing an intermediate product containing voids and consisting of a $SiO_2$ raw material doped with rare earth metal;

(b) introducing the intermediate product into a sinter mold with an interior bordered by a carbonaceous mold wall; and (c) melting the intermediate product into the component by gas pressure sintering at a maximum temperature above 1500° C., a shield being arranged between the mold wall and the intermediate product, characterized in that a bulk material of amorphous $SiO_2$ particles with a layer thickness of at least 2 mm is used as the shield, the softening temperature thereof being at least 20° C. higher than the softening temperature of the doped $SiO_2$ raw material, and the bulk material being gas-permeable at the beginning of the melting of the intermediate product according to the method step, and the bulk material sintering during melting into an outer layer that is gas-tight to a pressure gas, characterized in that the bulk material has a gas permeability which is defined by a Darcy coefficient in the range of $1.6 \times 10^{-11}$ m$^2$ to $3 \times 10^{-11}$ m$^2$, and that the bulk material has a grain size distribution which is characterized by a $D_{10}$ value between 150 and 250 μm and by a $D_{90}$ value between 350 and 450 μm.

16. A method of producing a component that consists at least in portions of a rare earth metal-doped quartz glass, the method comprising:

(a) providing an intermediate product containing voids and consisting of a $SiO_2$ raw material doped with rare earth metal;

(b) introducing the intermediate product into a sinter mold with an interior bordered by a carbonaceous mold wall; and (c) melting the intermediate product into the component by gas pressure sintering at a maximum temperature above 1500° C., a shield being arranged between the mold wall and the intermediate product, characterized in that a bulk material of amorphous $SiO_2$ particles with a layer thickness of at least 2 mm is used as the shield, the softening temperature thereof being at least 20° C. higher than the softening temperature of the doped $SiO_2$ raw material, and the bulk material being gas-permeable at the beginning of the melting of the intermediate product according to the method step, the bulk material sintering during melting into an outer layer that is gas-tight to a pressure gas, characterized in that gas pressure sintering comprises:

(a) a pretreatment which comprises a heating up of the intermediate product to a temperature in the range between 1000° C. and 1300° C. with application and maintenance of a negative pressure, (b) melting the intermediate product at a temperature above 1500° C. at a negative pressure and for a melting period of at least 30 min, wherein the bulk material sinters into the gas-impermeable outer layer, and (c) a pressure treatment of the molten intermediate product at a temperature above 1500° C. in an inert gas atmosphere under an overpressure in the range between 2 bar and 20 bar for a period of at least 30 min.

17. The method according to claim 16, characterized in that the intermediate product is temporarily exposed to an atmosphere which contains helium and/or hydrogen in a concentration of at least 50% by vol.

* * * * *